United States Patent [19]

Bank

[11] Patent Number: 4,615,136
[45] Date of Patent: Oct. 7, 1986

[54] FISHING SINKER

[76] Inventor: Morton A. Bank, 334 Glenwood Dr., Bismarck, N. Dak. 58501

[21] Appl. No.: 711,530

[22] Filed: Mar. 14, 1985

[51] Int. Cl.[4] ............................................... A01K 95/00
[52] U.S. Cl. ................................. 43/44.91; 43/44.92; 43/44.95
[58] Field of Search ................... 43/44.9, 44.91, 44.92, 43/44.95; 24/155 SD, 623, 129 D, 136 L, DIG. 29, 30.5 L, 488

[56] References Cited

U.S. PATENT DOCUMENTS

| 522,167 | 6/1894 | Rawlings | 43/44.9 |
|---|---|---|---|
| 2,315,048 | 3/1943 | Croft | 43/44.9 |
| 2,570,293 | 10/1951 | Vadnais | 43/44.91 |
| 2,729,015 | 1/1956 | Finnegan | 43/44.9 |
| 2,807,907 | 10/1957 | Brite | 43/44.91 |
| 2,872,752 | 2/1959 | Salzmann | 43/44.9 |
| 3,091,050 | 5/1963 | Metzler | 43/44.88 |
| 3,173,222 | 3/1965 | Hansen | 43/44.91 |
| 3,803,749 | 4/1974 | Boyum | 43/44.9 |
| 3,852,907 | 12/1974 | Haught | 43/44.9 |
| 3,955,305 | 5/1976 | Roberts | 43/44.91 |
| 4,008,539 | 2/1977 | Gardner | 43/44.9 |
| 4,138,795 | 2/1979 | Welle | 43/44.89 |
| 4,472,903 | 4/1984 | Hutson | 43/44.91 |

FOREIGN PATENT DOCUMENTS 484388  5/1938  United Kingdom ................ 43/43.1

Primary Examiner—Nicholas P. Godici
Assistant Examiner—Christopher L. McKee
Attorney, Agent, or Firm—Orrin M. Haugen; Thomas J. Nikolai; Frederick W. Niebuhr

[57] ABSTRACT

A fishing sinker which may be rapidly attached to and removed from a fishing line. The sinker comprises a mass of high density material which is generally symmetrical about a given axis and which has a longitudinal bore extending along said axis. A radial slit joins that bore to the exterior of the mass. Completing the assembly is a molded plastic insert which is adapted to be pushed into the bore in the mass. The insert also has a slit extending approximately halfway through the radial dimension thereof, and the insert is sized so that it can be rotated within the bore of the mass. By aligning the slit in the insert with the slit in the mass, a fishing line may be inserted into the aligned slits and then, when the insert is rotated, the line is captured and precluded from falling out.

4 Claims, 7 Drawing Figures

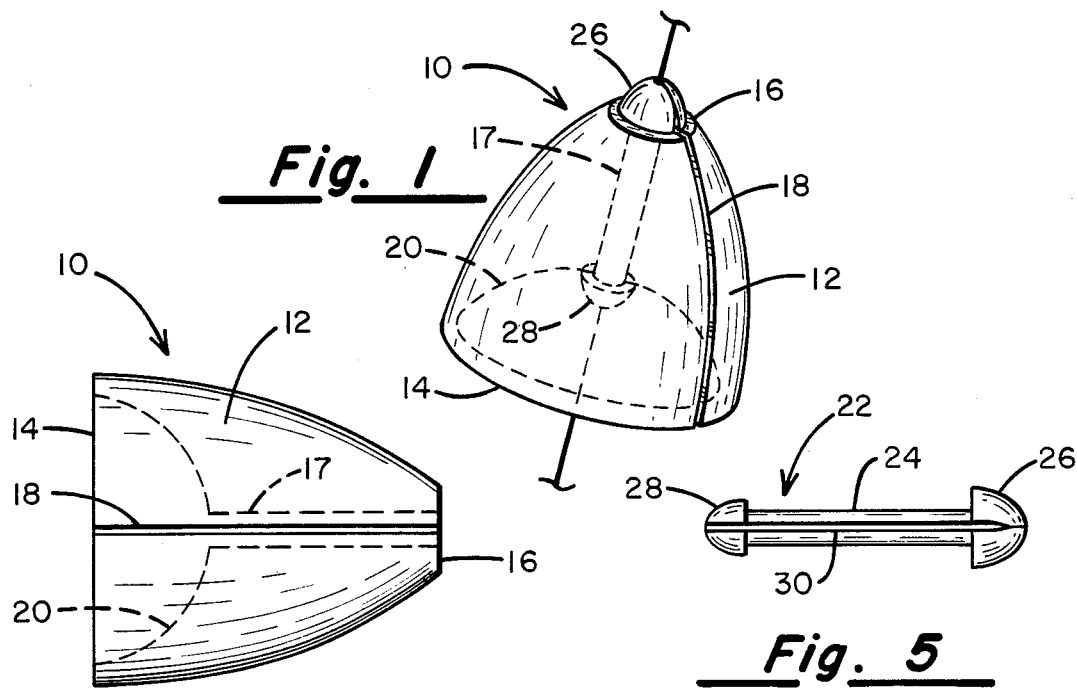
Fig. 1
Fig. 2
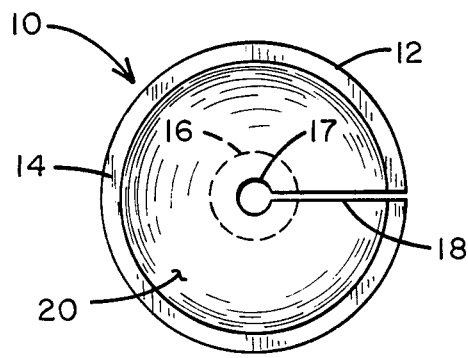
Fig. 3
Fig. 4
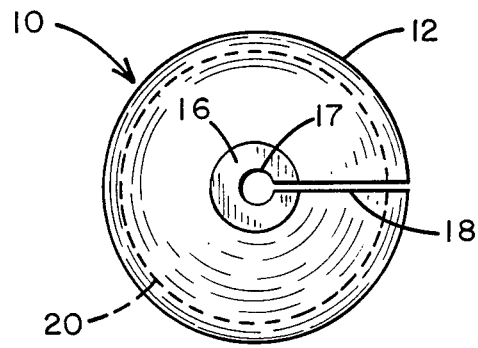
Fig. 5
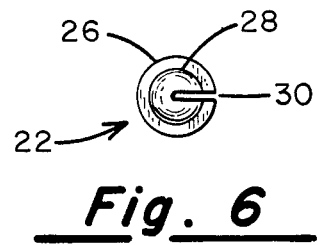
Fig. 6
Fig. 7
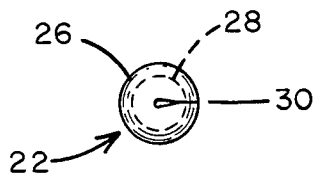

FISHING SINKER

BACKGROUND OF THE INVENTION

I. Field of the Invention

This invention relates generally to new and useful improvements in fishing sinkers, and more particularly to the design of such a fishing sinker, which allows it to be readily coupled and uncoupled from a fishing line by the fisherman, but which when placed on the line for fishing purposes will remain in place until removed by the fisherman.

II. Discussion of the Prior Art

Sinkers have long been used to cause the terminal end of a fishing line on which the hook and bait are joined to become submerged. A fisherman's tackle box will generally include sinkers of a variety of different weights, and the one selected for use at any given time is generally determined by the particular species of fish that one is going after and the characteristics of the water in which that species is generally found. Specifically, when fishing for smaller pan fish in quiet lakes with worms and minnows as bait, a fisherman can get by with a lighter weight sinker than when fishing in deep waters or in rivers and streams where the line and bait are subjected to buoyant forces or currents.

During any given period of fishing, the fisherman may elect to change or adjust the amount of weight being used on the end of the line. In that fishing is done in all types of weather, from the warm of summer to the cold of winter, it is desirable that a means be provided for readily and easily removing one sinker from the line and replacing it with the other. In cold weather, this is sometimes a difficult task when prior art sinkers are involved because the fisherman's fingers are necessarily exposed to frigid air and water. Accordingly, it is desirable that a fishing sinker be designed with a line-attaching mechanism that will reliably hold the sinker in place on the line but which will permit it to be released with a minimum of effort and time.

SUMMARY OF THE INVENTION

The fishing sinker in accordance with the present invention comprises a cast body made from a suitable material, such as lead or a lead alloy having the general shape of a frustum of a right circular cone and which has a longitudinal bore disposed along the central axis of the conic frustum. A line-receiving slit is provided which extends perpendicularly to the generally circular bases of the sinker body and which communicates with the central bore. Furthermore, a depression is formed in the larger of the bases of the frusto conical shaped mass.

Completing the sinker assembly is a molded plastic insert having generally cylindrical body over a substantial portion of its length and having an outside diameter which is slightly less than the diameter of the bore formed in the sinker mass. The opposed ends of the cylindrical insert are intregrally molded head portions and, again, a lateral slit extends halfway through the cylindrical insert and extends the entire length thereof. In that the slit in the insert also extends through the head portions on each end of the cylindrical body, and because the insert is fabricated from a flexible plastic material, the insert may be forced into the bore in the sinker material, causing the head on the leading edge of the insert to be compressed while passing through the bore. Once it extends beyond the end of the bore, it is free to expand and the insert is effectively held in place and cannot slip out of the bore without again having its head squeezed and compressed.

To attach the sinker assembly on a fishing line, the fisherman merely rotates the insert within the bore of the sinker until its lateral slit aligns with the lateral slit formed through the sidewall of the sinker mass itself. The line then is slipped into the center of the insert and then, when the insert is rotated, the line is captured. To remove the sinker, the fisherman merely inserts his thumb and forefinger into the depression formed in the major base of the sinker mass where he can readily grip the projecting end of the insert and turn it until its lateral slit is again aligned with the lateral slit in the sinker mass. Once the two slits are aligned, of course, the fishing line may be readily removed.

These and other features and advantages of the invention will become apparent to those skilled in the art from the following detailed description of a preferred embodiment, when considered in conjunction with the accompanying drawings in which like numerals in the several views refer to corresponding parts.

DESCRIPTION OF THE DRAWINGS

FIG. 1 is a perspective view of the sinker body fabricated in accordance with the present invention;

FIG. 2 is a side elevation of the sinker body;

FIG. 3 is a first end view of the sinker body of FIG. 2;

FIG. 4 is an opposite end view of the sinker body;

FIG. 5 is a side elevation of the insert member;

FIG. 6 is a first end view of the insert member; and

FIG. 7 is the opposite end view of the insert member.

DESCRIPTION OF THE PREFERRED EMBODIMENT

Referring to FIG. 1, there is generally indicated by numeral 10 the sinker assembly of the present invention. The assembly comprises a mass of a high density material (preferably lead), which is molded to exhibit the general shape of a frustum of a right circular cone 12 having a major base 14 and a minor base 16 at opposite ends thereof. It is not necessary that the side surfaces of the body 12 be straight and, instead, may exhibit a somewhat arcuate profile.

Centrally disposed within the body 12 is a longitudinally extending bore 17 of a predetermined uniform diameter, and extending laterally inward from the side surface of the body 12 is a longitudinal slit 18 which extends inwardly to join with the central bore 17.

With particular reference to FIGS. 2 and 3, it can seen that a concave depression 20 is formed in the major base 14 of the body 12.

FIGS 5–7 depict the line retaining insert used with the sinker body 12. The insert is identified generally by numeral 22 and seen to comprise a cylindrical rod segment 24 of an outside diameter which is slightly less than the diameter of the bore 17 formed through the sinker body 12. The insert 22 is preferably fabricated from a suitable plastic material, and integrally formed on each end of the cylindrical segment 24 are head segments 26 and 28. A longitudinal slit 30 extends laterally inwardly from the outside surface of the insert to the central longitudinal axis thereof. By viewing FIGS. 6 and 7, it can be seen that the slit 30 narrows to an essentially zero-clearance opening proximate the terminal end of the head portion 26 but is of a generally uniform width over the remaining portions of the insert 22.

When in use, the insert 22 is pressed into the longitudinal bore 17 of the sinker body 12 by inserting the head portion 28 into the opening of the bore 17 in the base 16. Because of the presence of the slit 30 and the flexible properties of the plastic material used in fabricating the insert, the head 28 is sufficiently compressed so that it can pass through the bore 17 until the head 28 exits that bore within the depression 20. At that point, the memory property of the plastic insert again allows the head portion 28 to spread and lock the insert in place within the bore 17. The configuration of the head 26 prevents further penetration of the insert within the bore.

To assemble the sinker on to a fishing line, the fisherman merely inserts his thumb and forefinger within the depression 20 in the major base 14 of the sinker body and turns the insert until its slit 30 is aligned with the slit 18 of the body 12. He then lays the fishing line into the aligned slits and, with a modest amount of force, wedges the line into the zero-clearance opening in the head portion 26 of the insert. This spreads the plastic and causes positive gripping of the line by the insert and, hence, the sinker assembly on the line. Now, by again twisting the insert so that its longitudinal slit 30 is no longer aligned with slit 18 of the sinker body, the line is captured and the sinker assembly 10 is prevented from falling off.

Removal of the sinker from the line merely involves reversing the above-described steps.

It should be apparent that the fisherman, prior to setting out to fish, will have already inserted the inserts 22 within his selection of weights or sinker bodies 12 so that, while fishing, attachment and removal of the sinker assembly only involves the appropriate alignment of the slits in the sinker body and insert and the insertion and removal of the line from the appropriately aligned slits.

Thus it can be seen that there is provided by this invention a new and improved fishing sinker. While there has been disclosed a preferred embodiment of the invention, it is to be understood that modifications or changes can be made in the specifics of the design disclosed without departing from the true spirit and scope of the invention. Hence, the characteristics of the invention are to be discerned from a consideration of the following claims.

What is claimed is:

1. A fishing sinker comprising:
   a mass of a high density material shaped generally as a right circular conic frustum having major and minor bases, said mass including a bore extending axially between said major base and said minor base and a slit extending radially outward from said bore to a side surface of said mass; and
   an insert member having a central cylindrical portion of an outside diameter less than the diameter of said bore in said mass and an unstressed length at least that of said bore, and first and second opposite head portions of a diameter greater than the diameter of said bore when said head portions are uncompressed, said insert member having a longitudinal slot extended radially inwardly along its length, said insert member being insertable into said bore upon compression of said first head portion, said first head portion expanding to its uncompressed configuration once it exits said bore, said insert member then being retained in said bore solely by said head portions positioned beyond the opposite ends of said bore, with said insert being rotatable therein.

2. The sinker assembly as in claim 1 wherein said mass includes an inwardly extending concave depression formed in said major base thereof.

3. The sinker assembly as in claim 1 wherein said longitudinal, slot in said insert member tapers to a zero-clearance opening proximate said second head portion, said second head portion having a larger diameter than said first head portion.

4. A method of securing a fishing sinker to a fishing line comprising the steps of providing a mass of high density material having a longitudinal cylindrical bore formed therethrough and a slit joining said bore to the exterior of said mass;
   (a) providing an insert member having a cylindrical central portion of a first diameter which is less than the diameter of said bore in said mass and an unstressed length at least that of said bore, and having enlarged head portions on both ends thereof, said insert member having a longitudinal slot extending radially inwardly along its length;
   (b) pressing said insert member longitudinally into said bore in said mass by elastically compressing one of said head portions, until said one head portion is moved out beyond said bore and expands to its unstressed configuration to then cooperate with the other head portion to comprise the sole means retaining said insert member rotatably in said bore;
   (c) rotating said insert member relative to said mass until said slit in said insert member is aligned with said slit in said mass;
   (d) fitting a fishing line into said slits in said mass and said insert when so aligned; and
   (e) rotating said insert relative to said mass so that said slit in said insert is no longer aligned with said slit in said mass.

* * * * *